United States Patent [19]

Spence

[11] 3,798,616

[45] Mar. 19, 1974

[54] STROBE DRIVER INCLUDING A MEMORY CIRCUIT

[75] Inventor: John R. Spence, Villa Park, Calif.

[73] Assignee: North American Rockwell Corporation, El Segundo, Calif.

[22] Filed: Apr. 14, 1972

[21] Appl. No.: 244,185

[52] U.S. Cl. .............................. 340/173 R, 307/238

[51] Int. Cl. .............................................. G11c 11/40

[58] Field of Search .................. 340/173 R; 307/238

[56] References Cited

UNITED STATES PATENTS

| | | | |
|---|---|---|---|
| 3,387,286 | 6/1968 | Dennard | 340/173 R |
| 3,541,530 | 11/1970 | Spampinato | 340/173 R |
| 3,576,571 | 4/1971 | Booker | 340/173 R |

*Primary Examiner*—Terrell W. Fears

*Attorney, Agent, or Firm*—L. Lee Humphries et al.

[57] ABSTRACT

Data is stored in one or more memory circuits of associated strobe drivers for providing strobe signal outputs during appropriate clock intervals of operating cycles. The memory circuits can be addressed through a read-wire (RAM) decode matrix. Each memory circuit includes internal circuitry for maintaining a stored voltage level throughout a cycle.

10 Claims, 1 Drawing Figure

PATENTED MAR 19 1974 3,798,616
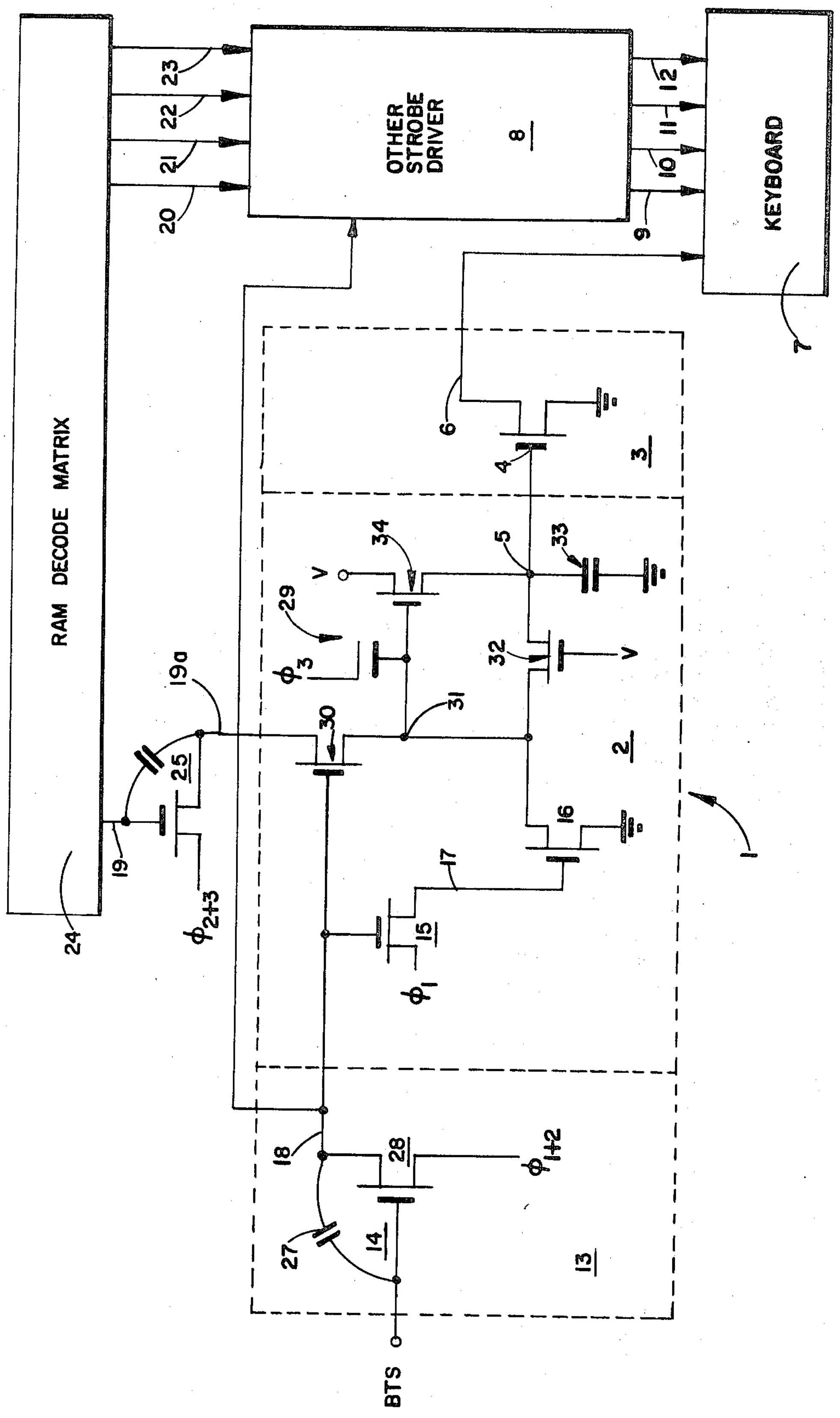

STROBE DRIVER INCLUDING A MEMORY CIRCUIT

FIELD OF THE INVENTION

The invention relates to strobe drivers including memory circuits and more particularly to such drivers for providing strobe output signals cyclically until data stored by the memory circuit is replaced.

SUMMARY OF THE INVENTION

Briefly, the invention comprises a two-clock field effect transistor memory cell which controls an output from a field effect transistor for implementing a strobe driver circuit. After being cleared at the beginning of each operating cycle, the memory cell is addressed, e.g. through a read-write (RAM) decode matrix. When addressed, the cell stores data used in the generation of a strobe output signal once during each operating cycle.

The memory cell includes an internal circuit path controlled by field effect transistors and charged capacitances for restoring any charge loss due to leakage. For example, when data is stored capacitances in the cell are charged. A circuit becomes operable when the charge leaks off a capacitance to cause the circuit to restore the leaked charge.

The data remains stored until replaced by new data during a subsequent cycle, e.g. following the execution of any command entered by the processing of the strobe signal through other circuits of a system. For example, a plurality of strobe drivers, each including memory cells, e.g. five, may be used to provide strobe signals to a calculator keyboard matrix. Strobe signals may also be used in connection with generating liquid crystal displays.

Data remains stored in a particular memory cell until any system input enabled by an interruption of the strobe signal has been processed. Thereafter, new data (clear) is entered into the cell and the next successive memory cell is addressed.

Therefore, it is an object of this invention to provide an improved strobe driver including a memory circuit for storing data through one operating cycle.

It is another object of this invention to provide a strobe driver circuit including a data storage circuit which can be addressed through a time shared RAM decode matrix.

A still further object of this invention is to provide a strobe driver using a two-clock field effect transistor memory cell for providing drive voltages on the gate electrode of an output field effect transistor in generating cyclical strobe output signals.

Still a further object of this invention is to provide a plurality of strobe driver circuits each including a memory cell which sequentially receives data from data sources for controlling an output field effect transistor to generate a strobe signal from each memory cell sequentially once each operating cycle.

Still a further object of this invention is to provide a strobe driver circuit having a memory capability which can be easily accessed with decoded outputs from RAM address lines and used to provide strobe signals to a calculator keyboard, a display, and other circuitry requiring strobe signal inputs.

Still another object of this invention is to provide a plurality of strobe drivers each including a memory cell for sequentially generating strobe signals.

Another object of this invention is to provide a strobe driver including a memory cell having the capability for restoring charge on storage capacitances lost because of charge leakage paths.

These and other objects of this invention will become more apparent when taken in connection with the description of the drawings, a brief description of which follows:

BRIEF DESCRIPTION OF DRAWINGS

The FIGURE is a schematic diagram of one embodiment of a strobe circuit including a memory cell which provides a drive voltage to the gate electrode of an output field effect transistor for providing a strobe signal output.

DESCRIPTION OF PREFERRED EMBODIMENT

The FIGURE is a schematic illustration of strobe driver circuit 1 comprising a memory cell 2 and strobe output driver 3. The output driver is implemented by a field effect transistor having its gate electrode 4 connected at the output node 5 of the memory cell 2. The strobe driver output on line 6 provides one strobe signal input to keyboard 7. Additional strobe signals are provided by other strobe circuits represented by block 8 via lines 9–12.

In a particular embodiment, one or more strobe driver circuits may be used. The FIGURE illustrates an application requiring five strobe driver circuits for generating five strobe signals.

The FIGURE also illustrates reset circuit 13 comprising bootstrap field effect transistor circuit 14. Field effect transistor 15 and field effect transistor 16 also used during the reset interval of the circuit operation are shown as part of the memory cell. In other embodiments, the field effect transistors could be included with the reset circuit 13 and lines provided to each memory cell. The function and operation of the transistors is described subsequently. Outputs from the reset circuit bootstrap field effect transistor circuit 14 are provided via line 18 to other strobe drivers represented by block 8.

Other inputs to the strobe drivers are received via lines 20, 21, 22 and 23 from a RAM (Random Access Memory) decode matrix designated by numeral 24. Bootstrap circuit 25 is shown in connection with strobe driver circuit 1 to illustrate a complete embodiment of one operating circuit. It should be understood that similar bootstrap transistor circuits are used in connection with the other strobe drivers.

The bootstrap driver 14 generates a clear signal in each memory cell during $\phi_1$ of each cycle when the BTS signal is true. When $\phi_1$ and BTS are true, the beginning of a cycle is indicated. When bootstrap driver 14 goes true at the beginning of $\phi_{1+2}$ field effect transistor 15 is turned on. Simultaneously, the true $\phi_1$ signal is applied to field effect transistor 16 for turning it on. As a result, any existing charge in the memory cell is discharged to electrical ground through field effect transistor 16.

The output of bootstrap driver 14 is applied to each memory cell during $\phi_2$ (BTS remains true for two clock intervals $\phi_{1\ and\ 2}$) to enable data to be written into an addressed memory cell from one of the lines 19–23.

For memory cell 2, the driver 14 output turns on field effect transistor 30, and data on line 19 is written into the cell through this transistor.

Both signals are generated simultaneously although the clear signal on line 17 goes false at the end of $\phi_1$ since the $\phi_1$ clock goes false after one clock interval. As a result, even though field effect transistor 15 remains on during $\phi_2$, the false state of $\phi_1$ is applied to the gate electrode of field effect transistor 16 to turn it off.

Drive voltages for field effect transistors 15 and 16 are generated by field effect transistor bootstrap circuit 14. The bootstrap circuit comprises a feedback capacitor 27 connected between one electrode and the gate electrode of field effect transistor 28 for feeding back voltage to the gate electrode. The fed back voltage substantially increases the gate electrode voltage for enhancing the conduction of the field effect transistor. The enhanced conduction enables the device to overcome the threshold drop between the two electrodes. For example, threshold drop of four or five volts may ordinarily expected. By using the field effect transistors in a bootstrap embodiment, the effective threshold drop can be reduced to approximately one volt.

When BTS is false, capacitor 27 is charged from the voltage on line 18 from the prior cycle. Thereafter, when BTS becomes true ($\phi_1$ becomes true simultaneously) the field effect transistor 28 becomes conductive and the clock voltage level is fed back across capacitor 27 to the gate electrode of field effect transistor 28. Line 18, therefore, receives approximately the full voltage level of the $\phi_{1+2}$ clock, i.e. the voltage level is not reduced by threshold drop across FET 28.

A similar bootstrap circuit 14 could be used for the field effect transistor device indicated by numeral 29. However, as described subsequently, it is possible to use another type of field effect device in that position.

The drive voltage on line 18 during BTS and $\phi_1$, turns field effect transistor 30 on. As a result, data on line 19a, resulting from the decoding of an address line in the RAM Decode matrix 24, is received by the memory cell 2 during $\phi_2$. Since $\phi_3$ is during $\phi_2$, the voltage passing through FET 30 is stored by the inherent capacitance at node 31. At the end of $\phi_2$, FET 30 is turned off. FET 32, used during $\phi_1$ for discharging the charge on capacitor 33 stored from the prior cycle, may be back biased at the beginning of $\phi_3$ because of the relative magnitudes of the voltage V on the gate electrode of FET 32 and the voltage stored at point 31.

During $\phi_3$, the field effect device 29 boosts the voltage at point 31 by a value approximately equal to the voltage level of clock $\phi_3$. In one embodiment, the field effect device 29 may be implemented by a diffused P region at an N type substrate to which a contact has been deposited. The $\phi_3$ clock is connected to the P region via the contact. An oxide layer over the substrate region adjacent the contact is thinned and a metal electrode is deposited over the thinned region and connected to node 31. During $\phi_2$, the voltage on node 31 (assumed true for purposes of this example) was sufficient to cause an inversion, i.e. exceed the threshold, of the substrate region under the metal electrode. Therefore, when the $\phi_3$ clock became true, by capacitor action, the $\phi_3$ clock added to the voltage already stored in node 31 for boosting the voltage at that point.

It should be understood that in the event the addressed line in the RAM Matrix 24 corresponding to line 19 had not been decoded, i.e. was false at the beginning of $\phi_2$, a false data bit represented by electrical ground would have appeared at line 19 and the boost effect achieved by the device 29 would not have occurred. In that case, line 19*a* would have remained at electrical ground, having been discharged during $\phi_1$. For the particular system embodiment shown, only one memory cell receives a true signal during any particular operating cycle. The nature of strobe generators requires that signals be generated in sequence. Therefore, only one signal is generated per cycle.

The boosted voltage at point 31 is applied to the gate electrode of load field effect transistor 34 for substantially enhancing the conduction of field effect transistor 34. As a result, substantially all of the voltage from source V is applied to point 5 for charging capacitor 33. The voltage at point 5 is also applied to the gate electrode 4 of strobe driver field effect transistor 3 for enabling a completed circuit through the field effect transistor via strobe driver output line 6 to electrical ground. Therefore, an equivalent line within a keyboard matrix could be dropped to electrical ground by the depression of, e.g. a key. The other lines would remain high since no electrical path would exist through a field effect transistor equivalent to field effect transistor 3 of strobe driver circuit 1.

The data is stored in a particular memory cell, e.g. memory cell 2, until a command initiated by a depressed key is completed. When a command has been completely executed by other logic of a system (not shown) a new cycle is initiated when BTS becomes true during $\phi_1$. Between cycles the data is not changed. At the beginning of the cycle, field effect transistor 16 becomes true for connecting point 31 and point 5 to ground through field effect transistor 32. Field effect transistor 32 is held on by voltage V applied to its gate electrode. As a result, previously stored charge on capacitor 33 is discharged to electrical ground.

During the next cycle, the data on line 19 is false and a true data bit appears on line 20. The sequence is repeated until strobe signals have been generated on each of the lines 6 through 12.

What is claimed is:

1. A strobe driver including a memory circuit, said driver comprising:

a field effect transistor memory cell;

an output field effect transistor for enabling the generation of strobe signals as a function of data stored in the memory cell, said memory cell having an output connected to the gate electrode of said output field effect transistor and an input for periodically receiving data to be stored during an operating cycle;

a boosting field effect transistor device for enabling the charging of a first storage capacitor in said memory cell to a voltage level representing the data on the input of said memory cell, said boosting field effect transistor device including a second storage capacitor for storing a boosted voltage level, and said memory cell further including a load field effect transistor responsive to charge on said second storage capacitor and an isolation field effect transistor which is rendered conductive by the relative charge on said first and second storage capacitors, said isolation transistor comprising part of an electrical circuit for connecting said first storage capacitor to said second storage capacitor for replacing said charge leaked from said second storage capacitor, said replaced charge enabling the enhanced conduction of said load field effect transistor for charging said first storage capacitor.

2. A strobe driver including a memory circuit, said driver comprising:

a field effect transistor memory cell;

an output field effect transistor for enabling the generation of strobe signals as a function of data stored in the memory cell, said memory cell having an output connected to the gate electrode of said output field effect transistor and an input for periodically receiving data to be stored during an operating cycle;

a load field effect transistor and a first storage capacitor connected in electrical series between a voltage source and a reference voltage level, said output field effect transistor being connected at a common point between said load field effect transistor and said first storage capacitor;

a second field effect transistor connected between said common point and a resetting circuit means including a reset field effect transistor for discharging said capacitor to a reference voltage level at the beginning of each operating cycle;

a third field effect transistor connected between said second field effect transistor and an input terminal to said memory cell, said third field effect transistor being controlled by said resetting circuit means for enabling data to be written into said memory cell after said memory cell has been reset to said reference data state; and a boosting field effect device connected between said third field effect transistor and the gate electrode of said load field effect transistor for providing a boosted voltage level on the gate electrode of said load field effect transistor when data of a certain state is being stored by said memory cell.

3. The strobe driver as recited in claim 2 wherein said output field effect transistor is connected in series between a strobe line and a reference voltage level for completing an electrical circuit through said output field effect transistor in response to certain data stored by said memory cell.

4. The strobe driver recited in claim 2 wherein said resetting circuit means comprises said reset field effect transistor connected to a common point between said second and third field effect transistors and the reference voltage level, said reset field effect transistor having its gate electrode connected through an additional field effect transistor to a clock signal which turns said reset field effect transistor on during a first interval of said operating cycle, the gate electrode of said additional field effect transistor being connected to the output of a further field effect transistor circuit which provides drive voltages during first and second intervals of said operating cycle in response to a cycle initiate signal.

5. A strobe driver arrangement comprising:

a plurality of strobe output lines;

a plurality of field effect transistor memory cells, each memory cell including an output node and a storage node for storing information as voltage levels representing first or second logic states;

means interconnecting the output nodes of said memory cells with respective ones of said strobe output lines to provide strobe output signals at said strobe output lines, the strobe output signal for a particular strobe output line being a function of the logic state of information stored in the memory cell corresponding to the particular strobe output line; and circuit means controlling operation of the strobe driver arrangement to generate strobe signals representing a desired logic state for sequential application to the respective strobe output lines.

6. The strobe driver arrangement of claim 5 wherein said means interconnecting includes a plurality of output field effect transistors, each output field effect transistor having its source-drain path connected between a respective strobe output line and a source of reference voltage and its gate electrode connected to the output node of its corresponding memory cell, whereby the conduction of the output transistor is controlled by the voltage at the output node.

7. The strobe driver arrangement of claim 6 wherein said circuit means includes:

means for writing said information into each said memory cell for storage at said storage node;

field effect boost means for boosting the stored voltage level at said storage node for the first but not the second of said logic states;

a load field effect transistor having its gate electrode connected to said storage node and its source-drain path connected between a voltage source and said output node, said load field effect transistor being rendered conductive by the boosted voltage level at its gate electrode for providing an increased voltage output at said output node for application to the associated output field effect transistor.

8. The strobe driver arrangement of claim 7 including an isolation field effect transistor having its source-drain path connected between the output and storage nodes, bias means for rendering the isolation transistor non-conductive when the boosted voltage level is present at the storage node, whereby charge leakage from the storage node is prevented and the increased voltage output is maintained at the output node.

9. The strobe driver arrangement of claim 7 including means for resetting said memory cells to said second of said logic levels at the beginning of an operating cycle.

10. The strobe driver arrangement of claim 9 wherein said means for resetting includes an isolation transistor having its source-drain path connected between the output and storage nodes, a reset field effect transistor having its source-drain path connected between said storage node and a source of reference voltage, said reset field effect transistor when rendered conductive serving to connect the storage node to the source of reference voltage and to connect the output node to the source of reference voltage through the isolation field effect transistor.

* * * * *

PO-1050
(5/69)

UNITED STATES PATENT OFFICE
CERTIFICATE OF CORRECTION

Patent No. 3,798,616 Dated March 19, 1974

Inventor(s) John R. Spence

It is certified that error appears in the above-identified patent and that said Letters Patent are hereby corrected as shown below:

In the Abstract, line 5, change "read-wire" to --read-write--.

Column 3, line 41, after "is" insert --false--.

Column 6, line 11, after "means" insert --connected to said memory cells--.

line 12, after "strobe" insert --output--.

line 24, after "claim 6" insert --including:--.

line 24 and 25, delete "wherein said circuit means includes:"

line 31, after "states;" insert --and--.

line 50, after "logic" delete "levels" and insert --states--.

line 54, after "nodes," insert -and--.

Signed and sealed this 13th day of August 1974.

(SEAL)
Attest:

McCOY M. GIBSON, JR.
Attesting Officer

C. MARSHALL DANN
Commissioner of Patents